United States Patent
Mori

(10) Patent No.: US 10,252,375 B2
(45) Date of Patent: Apr. 9, 2019

(54) LASER PROCESSING SYSTEM HAVING FUNCTION OF PREPARING TO RESTART PROCESSING

(71) Applicant: FANUC CORPORATION, Minamitsuru-gun, Yamanashi (JP)

(72) Inventor: Atsushi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/698,351

(22) Filed: Apr. 28, 2015

(65) Prior Publication Data

US 2015/0314394 A1 Nov. 5, 2015

(30) Foreign Application Priority Data

Apr. 30, 2014 (JP) ................................ 2014-093565

(51) Int. Cl.
*G05B 19/4067* (2006.01)
*B23K 26/14* (2014.01)
*B23K 26/04* (2014.01)
(Continued)

(52) U.S. Cl.
CPC ........ *B23K 26/1464* (2013.01); *B23K 26/048* (2013.01); *B23K 26/38* (2013.01);
(Continued)

(58) Field of Classification Search
CPC ...... B23K 26/02; B23K 26/14; B23K 26/382; B23K 26/1464; G05B 19/4067; G05B 2219/24139; G05B 2219/36199
(Continued)

(56) References Cited

U.S. PATENT DOCUMENTS 4,555,610 A * 11/1985 Polad .................... B23K 26/00
219/121.61
4,945,207 A * 7/1990 Arai ...................... B23K 26/14
219/121.64
(Continued)

FOREIGN PATENT DOCUMENTS

CN 101135898 A 3/2008
DE 69105681 T2 5/1995
(Continued)

OTHER PUBLICATIONS

Japanese Office Action dated Sep. 11, 2015 for Japanese Application No. 2014-093565.
(Continued)

*Primary Examiner* — Tu B Hoang
*Assistant Examiner* — Erin E McGrath
(74) *Attorney, Agent, or Firm* — RatnerPrestia

(57) ABSTRACT

A laser processing system including a laser processing unit, a controller controlling the processing unit according to a laser processing program, and a restart preparation apparatus performing a preparation process of the controller to resume the program execution after being suspended. The restart preparation apparatus includes an operating state judging section judging whether an operating state of the processing unit when suspending the program execution is in course of laser processing, and a restart condition specifying section specifying a restart condition of the processing unit when resuming the program execution, from among predetermined conditions, based on a judgment result. The operating state judging section judges that the operating state is in course of laser processing, if a predetermined operation command for processing the workpiece is output from the controller, or predetermined external information for pro-
(Continued)

cessing the workpiece is input to the controller, at the instant of suspending the program execution.

13 Claims, 6 Drawing Sheets

(51) Int. Cl.
    *B23K 26/38*    (2014.01)
    *B23K 26/382*   (2014.01)
    *B23K 26/70*    (2014.01)

(52) U.S. Cl.
    CPC .......... *B23K 26/382* (2015.10); *B23K 26/706* (2015.10); *G05B 19/4067* (2013.01); *G05B 2219/24139* (2013.01); *G05B 2219/36199* (2013.01)

(58) Field of Classification Search
    USPC .............. 219/121.83, 121.6, 121.61, 121.67, 219/121.72, 121.78, 121.84
    See application file for complete search history.

(56) References Cited

U.S. PATENT DOCUMENTS

| | | | | |
|---|---|---|---|---|
| 5,293,024 A | * | 3/1994 | Sugahara | ............... B23K 26/08 219/121.67 |
| 5,847,359 A | * | 12/1998 | Sugahara | ............... B23K 26/08 219/121.67 |
| 5,852,276 A | | 12/1998 | Yamazaki et al. | |
| 6,675,059 B2 | | 1/2004 | Scott | |
| 2009/0055016 A1 | | 2/2009 | Fujibayashi et al. | |

FOREIGN PATENT DOCUMENTS

| | | |
|---|---|---|
| DE | 69208422 T2 | 10/1996 |
| EP | 0477458 B1 | 12/1994 |
| EP | 0540888 B1 | 2/1996 |
| JP | 58204585 | 11/1983 |
| JP | 5939081 | 3/1984 |
| JP | 63203291 | 8/1988 |
| JP | 02137684 | 5/1990 |
| JP | H04000488 | 1/1992 |
| JP | 05-158520 A | 6/1993 |
| JP | 2003225783 | 8/2003 |
| TW | 216775 B | 12/1993 |
| WO | 9414566 A1 | 7/1994 |

OTHER PUBLICATIONS

SIPO First Office Action issued in Chinese Patent Application No. 201510209375.3 dated Jul. 12, 2016 (10 pages).

German Office Action with English language translation for Application No. 10 2015 005 199.7, dated Apr. 24, 2017, 18 pages.

* cited by examiner

LASER PROCESSING SYSTEM HAVING FUNCTION OF PREPARING TO RESTART PROCESSING

BACKGROUND OF THE INVENTION

1. Field of the Invention

The present invention relates to a laser processing system having a function of preparing to restart a processing.

2. Description of the Related Art

In a laser processing system configured to process a workpiece by laser beam, there can be a situation in which, during a time when a controller executes a laser processing program, the execution of the laser processing program is suspended, due to an abnormality in supply of electric power or medium (especially, gas), used for laser oscillation, or an abnormality in supply of assist gas to a point to be processed, or alternatively, according to an intentional stop instruction provided by an operator or an emergency stop signal for ensuring safety. If the execution of the laser processing program is suspended during a time when the operating state of a laser processing unit (including a laser oscillator and a processing head) operating in accordance with the laser processing program is a state where a processing such as cutting or welding is actually performed on a workpiece (the state being referred to as "in course of laser processing", in the present application), processing quality of a portion to be processed on the workpiece may be affected, depending on a restart condition of the laser processing unit (such as the presence or absence of laser oscillation, the position of the processing head, etc.) at an instant when the controller resumes the execution of the laser processing program. For example, if the laser processing unit is restarted at a position identical to a position where the program is suspended in course of laser processing, the processing head starts to move before laser power reaches a target value, which may cause defects in processing. In order to avoid such defects, if the laser processing unit is restarted at a position slightly went back along a processing path from the position where the program is suspended in course of laser processing, the already-processed portion of the workpiece is processed in a duplicative manner, which may degrade the processing quality.

A laser processing system capable of resuming, after suspending the execution of a laser processing program, the execution at a position different from a position where the execution is suspended, has been known. For example, Japanese Unexamined Patent Publication No. H05-158520 (JPH05-158520A) discloses a laser processing apparatus equipped with a function of stopping a processing by detecting abnormality when the abnormality occurs, which can automatically restart and proceed with the processing, at a position different from a position where the occurrence of abnormality is detected, or alternatively, depending on the type of abnormality, at a position identical to a position where the occurrence of abnormality is detected. JPH05-158520A describes that a restart position is specified in a processing program and, as an example, the restart position is set at a start point or endpoint of a block being executed. JPH05-158520A also describes "in a case where a block in the processing program executed at the time of stopping the processing represents an operation of moving for a positioning, the processing using laser beam 2 is not being performed, and therefore, by moving the apparatus to the endpoint (i.e., the target point of positioning) of the block and restarting the processing at that point, it is possible to prevent a processed product from being defective" and "in a case where a block in the processing program executed at the time of stopping the processing represents an operation of moving during processing subsequent to a piercing, by moving the apparatus to the start point of the block and restarting the processing at that point, it is probably possible to prevent a processed product from being defective". Thus, the technique described in JPH05-158520A is configured to judge whether or not the operating state of the laser processing apparatus is in course of laser processing, at an instant when the program is suspended, based on statements described in the processing program.

SUMMARY OF THE INVENTION

In a laser processing system, from the viewpoint of reducing an influence on the processing quality of a portion to be processed on a workpiece due to the suspension and subsequent resumption of a laser machining program, it is desired to accurately judge the operating state of a laser processing unit at an instant when the execution of the laser processing program is suspended, and thereby to make it possible to appropriately determine a restart condition of the laser processing unit when the execution of the laser processing program is resumed, depending on the operating state at the instant of suspending the program execution.

One aspect of the present invention provides a laser processing system comprising a laser processing unit; a controller configured to control the laser processing unit in accordance with a given laser processing program; and a restart preparation apparatus configured to perform a preparation process for enabling the controller to resume execution of the laser processing program after the execution is suspended, the restart preparation apparatus comprising an operating state judging section configured to judge whether or not an operating state of the laser processing unit, at an instant when execution of the laser processing program is suspended, is in course of laser processing, during which a workpiece is actually processed; and a restart condition specifying section configured to specify a restart condition of the laser processing unit when execution of the laser processing program is resumed, from among predetermined conditions in the laser processing program, based on a judgment result of the operating state judging section, the operating state judging section being configured to judge that the operating state is in course of laser processing, in a case where, at the instant when execution of the laser processing program is suspended, a predetermined operation command required for the laser processing unit to process the workpiece is output from the controller, or alternatively, predetermined external information required for the laser processing unit to process the workpiece is input to the controller.

According to the laser processing system of one aspect, the operating state judging section of the restart preparation apparatus is capable of accurately judging whether or not the operating state of the laser processing unit, at the instant when the execution of the laser processing program is suspended, is in course of laser processing, and thereby the restart condition specifying section of the restart preparation apparatus is capable of appropriately determining the restart condition of the laser processing unit when the execution of the laser processing program is resumed, depending on the operating state of the laser processing unit at the instant of suspending the program execution. Consequently, it is possible to reduce the influence on the processing quality of a portion to be processed on a workpiece due to the program suspension and the subsequent program resumption.

BRIEF DESCRIPTION OF THE DRAWINGS

The above and other objects, features, and advantages of the present invention will become more apparent from the description of the embodiments as set forth below with reference to the accompanying drawings, wherein.

DETAILED DESCRIPTION

Embodiments of the present invention will be described below with reference to the accompanying drawings.

Figure 1:
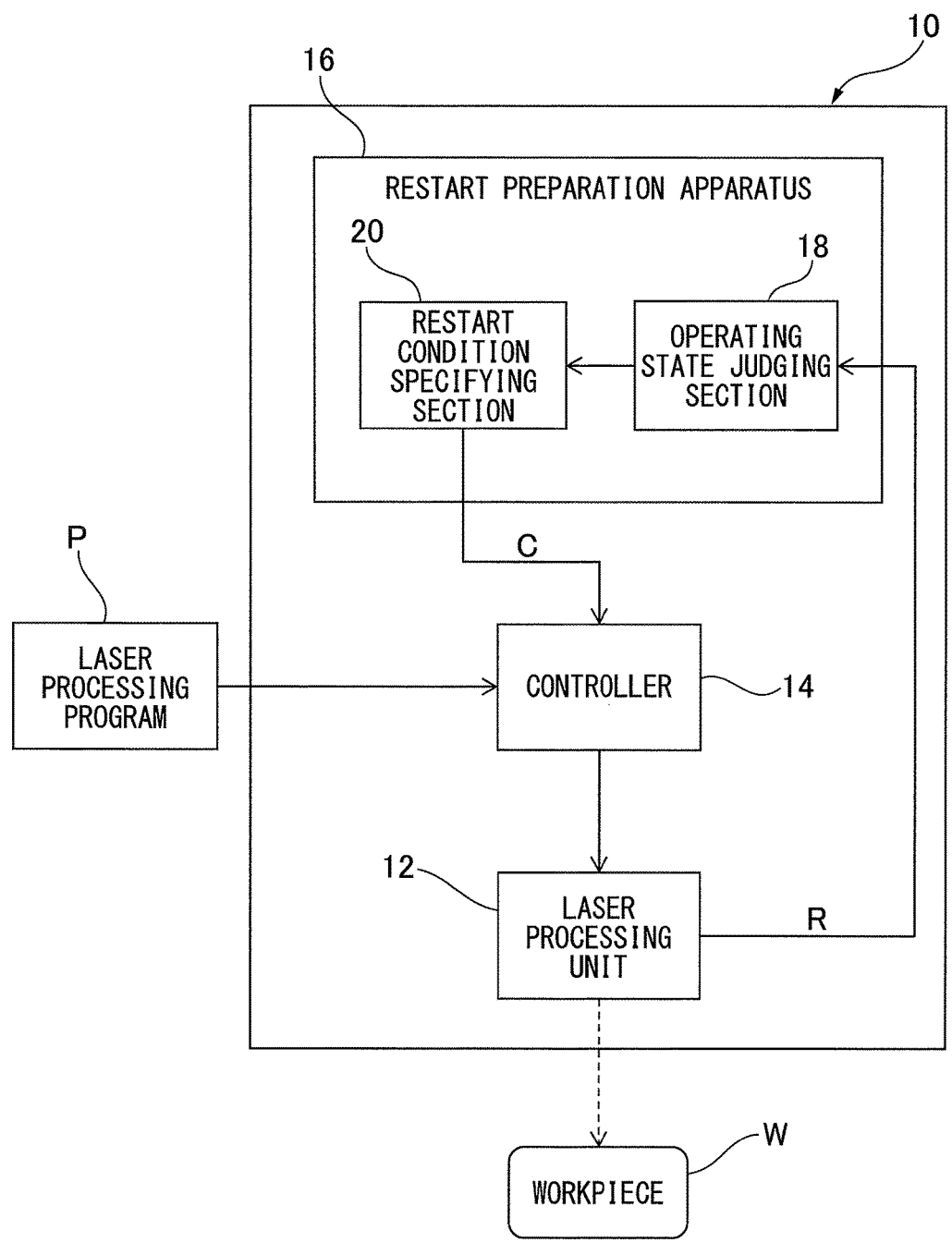
FIG. 1 is a functional block diagram showing the basic configuration of a laser processing system.

FIG. 1 shows in functional block form the basic configuration of a laser processing system 10 according to one aspect of the present invention. The laser processing system 10 includes a laser processing unit 12, a controller 14 configured to control the laser processing unit 12 in accordance with a given laser processing program P, and a restart preparation apparatus 16 configured to perform a preparation process for enabling the controller 14 to resume execution of the laser processing program P after the execution is suspended. The restart preparation apparatus 16 includes an operating state judging section 18 configured to judge whether or not an operating state R of the laser processing unit 12, at an instant when the execution of the laser processing program P is suspended, is in course of laser processing, during which a workpiece W is actually processed, and a restart condition specifying section 20 configured to specify a restart condition C of the laser processing unit 12 when the execution of the laser processing program P is resumed, from among predetermined conditions given in the laser processing program P, based on a judgment result of the operating state judging section 18.

Figure 2:
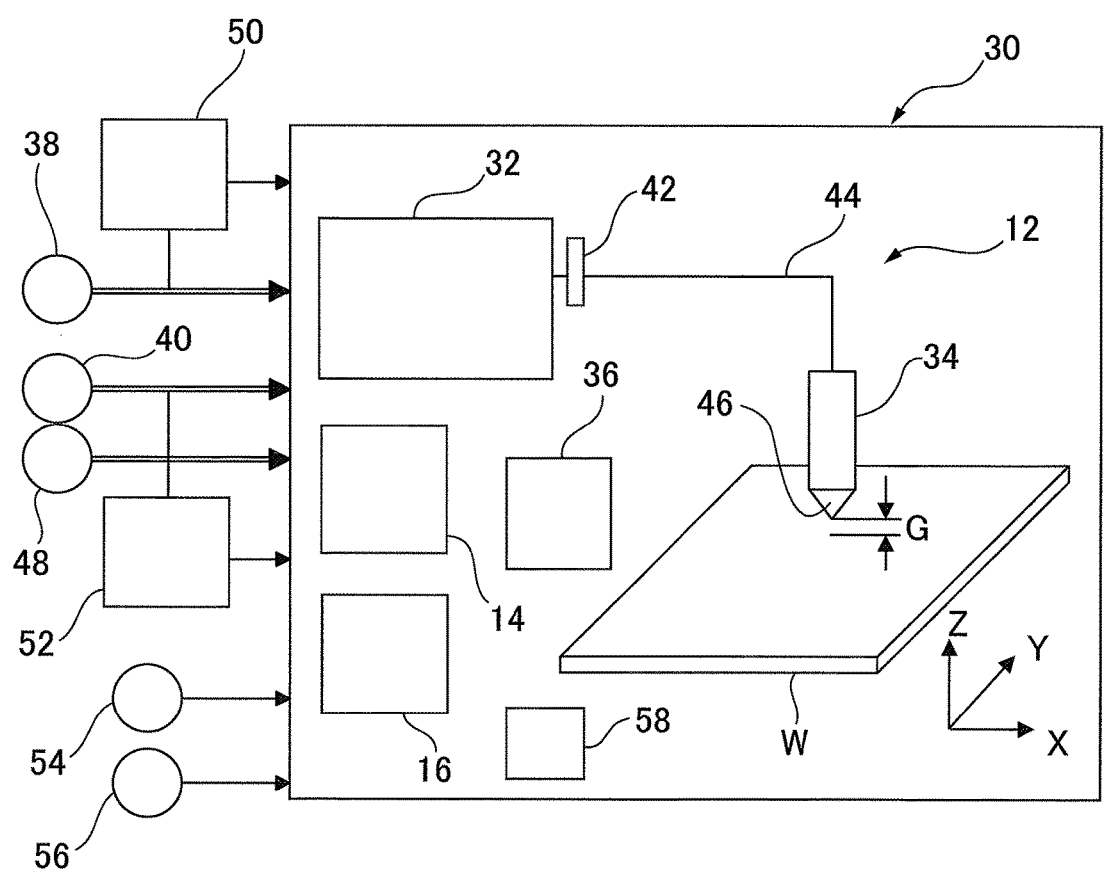
FIG. 2 is a diagram schematically showing the configuration of a laser processing system according to one embodiment.

The functions of the laser processing system 10 having the above basic configuration will be described in further detail by referring to the configuration of a laser processing system 30 shown in FIG. 2 as one embodiment. FIG. 2 schematically depicts the laser processing system 30 according to one embodiment that includes the aforementioned basic configuration, and components thereof, corresponding to those in the laser processing system 10 of FIG. 1, are designated by the same reference numerals.

In the laser processing system 30 of FIG. 2, the laser processing unit 12 includes a laser oscillator 32, a processing head 34, and a driving mechanism 36 for moving the processing head 34 and the workpiece W relative to each other. When the laser processing unit 12 is configured to perform laser processing, such as cutting, welding, heat treatment, etc., on a workpiece W made of a metallic or nonmetallic material, the laser oscillator 32 may be configured to produce high power laser beam such as 1 kW to 8 kW, and electric power for producing the laser beam is supplied to the laser oscillator 32 from an external power supply 38. When the laser oscillator 32 is a carbon dioxide gas laser oscillator, a laser medium comprising a gas mixture of carbon dioxide ($CO_2$), nitrogen ($N_2$), helium (He), etc., is supplied intermittently or continuously to the laser oscillator 32 from an external gas supply source 40. An openable/closable shutter 42 for physically blocking the emission of the laser beam may be provided in the laser oscillator 32.

The laser beam emitted from the laser oscillator 32 is introduced into the processing head 34 through a light guide means 44 including an optical fiber, a reflective mirror, etc. The processing head 34 is provided with an optical element such as a lens for focusing the laser beam, and performs laser processing by irradiating a narrow area of the surface of the workpiece W with the laser beam through a processing nozzle 46 formed at the end of the head. During the laser processing, an assist gas composed of oxygen, nitrogen, air, argon, etc., is blown onto a point to be processed on the workpiece W and an area surrounding it. The assist gas is supplied to the processing head 34 from an external gas supply source 48.

The driving mechanism 36 is capable of selectively moving the processing head 34 relative to the workpiece W toward or away from each other. Further, the driving mechanism 36 is capable of moving the processing head 34 and the workpiece W relative to each other in a direction along the workpiece surface. For example, the driving mechanism 36 is capable of moving the processing head 34 and the workpiece W relative to each other in a three-dimensional fashion with three control axes (X-axis, Y-axis and Z-axis) operating in accordance with commands defined in an orthogonal three-axis coordinate system. In this case, the driving mechanism 36 may include a servo motor and a power transmitting mechanism, for each control axis. The respective control axes may be set for either one or both of the processing head 34 and the workpiece W. For example, the control axes may be configured so that the processing head 34 is driven by Z-axis and moved vertically relative to the workpiece W and a work table (not shown), on which the workpiece W is fixed, is driven by X-axis and Y-axis and moved horizontally relative to the processing head 34.

The controller 14 may be configured as, for example, a numerical control unit. The controller 14 interprets the laser processing program P (FIG. 1) and outputs an operation command to an object to be controlled, including the laser processing unit 12, and thereby is capable of causing the driving mechanism 36 to move the processing head 34 or the workpiece W, causing the laser oscillator 32 to produce and emit laser beam, or causing the gas supply source 48 to supply assist gas to the processing head 34. The controller 14 is also capable of performing a so-called gap control, in which the controller 14 refers in real time to a shortest distance (i.e., a gap) G between the end of the processing nozzle 46 and the processed point on the workpiece W and controls the driving mechanism 36 so as to maintain the gap G at a target value during the laser processing. The restart preparation apparatus 16 may be configured as one of the functions of the controller 14. Alternatively, the restart preparation apparatus 16 may be configured by another CPU different from the controller 14.

In the laser processing systems 10 and 30 shown in FIGS. 1 and 2, there can be a situation in which, during a time when the controller 14 executes the laser processing program P, the execution of the laser processing program P is suspended, due to an abnormality in supply of electric power or medium (especially, gas), used for laser oscillation, or an abnormality in supply of assist gas to a point to be processed, or alternatively, according to an intentional stop instruction provided by an operator or an emergency stop signal for ensuring safety. In the laser processing system 30 of FIG. 2, a power supply abnormality due to a power failure, such as a power outage or voltage drop, is detected by a power outage detector 50, and an abnormality detection signal is sent from the power outage detector 50 to the controller 14. A gas supply abnormality due to an operational failure, etc., of the gas supply source 40, 48 is detected by a gas pressure sensor 52, and an abnormality detection signal is sent from the gas pressure sensor 52 to the controller 14. On the other hand, when an operator intentionally stops the operation of the laser processing system 30 in order, for example, to visually check the processed part of the workpiece W during laser processing, the operator operates a stop switch 54 and thereby a stop signal is sent to the controller 14 from the stop switch 54. For ensuring safety in a case where, for example, a person or other object enters a predetermined no-trespassing area, a safety switch 56 is automatically activated, and an emergency stop signal is sent from the safety switch 56 to the controller 14.

When the abnormality detection signal or stop signal is received, the controller 14 immediately suspends the execution of the laser processing program P and stops the operation of the laser processing unit 12. The laser processing system 10, 30 may include a storage section 58 (FIG. 2) configured to store the operating state R of the laser processing unit 12 at the instant of suspending the laser processing program P. The operating state R stored in the storage section 58 may comprise, for example, a statement written in the laser processing program P, an operation command output from the controller 14 to the object to be controlled, or feedback information input from the object to be controlled to the controller 14.

In the laser processing systems 10 and 30 shown in FIGS. 1 and 2, when the abnormality in power supply or gas supply is resolved, or when the emergency stop signal or the operator's stop instruction is removed, the controller 14 resumes the execution of the laser processing program P. The restart preparation apparatus 16 performs the following preparation process for enabling the controller 14 to resume the execution of the laser processing program P, which makes it possible to suitably determine the restart condition C (i.e., the operating condition of the laser oscillator 32, the position of the processing head 34, etc.) for the laser processing unit 12 when the execution of the laser processing program P is resumed, depending on the operating state R of the laser processing unit 12 at the instant when the program execution is suspended.

More specifically, the operating state judging section 18 is configured to judge that the operating state R of the laser processing unit 12 at the instant of suspending the program execution is "in course of laser processing", in a case where a predetermined operation command required for the laser processing unit 12 to process the workpiece W is being output from the controller 14, or alternatively, predetermined external information required for the laser processing unit 12 to process the workpiece W is being input to the controller 14, at the instant when the execution of the laser processing program is suspended. On the other hand, the operating state judging section 18 is configured to judge that the operating state R of the laser processing unit 12 at the instant of suspending the program execution is not "in course of laser processing", in a case where a predetermined operation command required for the laser processing unit 12 to process the workpiece W is not output from the controller 14, and predetermined external information required for the laser processing unit 12 to process the workpiece W is not input to the controller 14, at the instant when the execution of the laser processing program is suspended. The operating state R of the laser processing unit 12 at the instant of suspending the program execution may be obtained from the storage section 58 (FIG. 2).

In the above configuration, the predetermined operation command is prepared by decoding and calculating the laser processing program P by the controller 14, and is output from the controller 14 to each of the various objects to be controlled. Further, in the above configuration, the predetermined external information is generated by a detector configured to detect a controlled variable of each of the various objects to be controlled by the controller 14, and is input to the controller 14 as feedback information from the detector. As will be described later, since it is difficult to accurately judge the operating state R of the laser processing unit 12 based only on an operation command (e.g., a move command for the control axis) or external information (e.g., position information of the control axis) relating to the movement of the processing head 34, such operation command or external information may be excluded from the aforementioned predetermined operation command and the aforementioned predetermined external information.

For example, the predetermined operation command may comprise an assist gas supply command that is provided by the controller 14 for a supply control section (not shown) of the gas supply source 48. Further, the predetermined external information may comprise a monitoring signal of an assist gas pressure (hereinafter referred to as an assist gas supply monitoring signal) which is fed back to the controller 14 from an assist gas pressure measuring device (not shown) attached to the processing head 34. In this configuration, the operating state judging section 18 compares the assist gas supply monitoring signal with a predetermined threshold value and, if the assist gas pressure is higher than the threshold value, is capable of judging that the operating state R is in course of laser processing.

Alternatively, the predetermined operation command may comprise a shutter open command that is provided by the controller 14 for an open/close control section (not shown) of the shutter 42. The predetermined external information may comprise a shutter open monitoring signal that is fed back to the controller 14 from an open/close detector (not shown) of the shutter 42.

Alternatively, the predetermined operation command may comprise a gap control command that is provided by the controller 14 for the driving mechanism 36. The predetermined external information may comprise a gap amount monitoring signal that is fed back to the controller 14 from a gap measuring device (not shown). In this configuration, the operating state judging section 18 compares the gap amount monitoring signal with a predetermined threshold value and, if the gap amount is not larger than the threshold value, is capable of judging that the operating state R is in course of laser processing.

Generally, a laser processing includes various precedent or subsequent operations, such as the blowing of assist gas, the opening or closing of shutter, and the initiation of gap control, which are performed by the laser processing unit 12 before or after the oscillation of laser beam. For example, in the case of laser welding, the supply of filler is one of precedent operations, while in the case of laser cutting, the supply of oil on the surface of a workpiece for improving cutting quality is one of precedent operations. The precedent or subsequent operation may affect processing quality, and therefore, in order to appropriately perform a restart preparation process after the suspension of a program execution, it is advantageous that not only a process during a time when a workpiece W is irradiated with a laser beam but also a precedent or subsequent operation is considered as being "in course of laser processing".

For example, the supply of the assist gas to the processing head 34 (FIG. 2) is a precedent operation that is started prior to the laser oscillation, and the actual processing is started after the pressure and flow rate of the assist gas have reached respective target values. In other cases, after stopping the laser oscillation, the supply of the assist gas may be continued (i.e., as a subsequent operation) in order to cool the workpiece W or shield the heated workpiece W from oxygen, nitrogen, moisture, etc., in ambient air after the irradiation with the laser beam is stopped. On the other hand, the open/close operation of the shutter 42 (FIG. 2) is not only a precedent opening operation performed before starting the laser oscillation, but also a subsequent closing operation performed after terminating the laser oscillation. Further, in the gap control, a precedent operation for bringing the dimension (i.e., the amount) of the gap G (FIG. 2) to a target value is performed before starting the laser oscillation. In the case where the workpiece W is cut at high speed, the gap control may be continued (i.e., as a subsequent operation) after terminating the laser oscillation, in order to move the processing head 34 at the same speed as that during the laser oscillation.

From the above viewpoint, the operating state judging section 18 having the aforementioned configuration is capable of accurately judging whether or not the operating state R of the laser processing unit 12, at the instant when the controller 14 suspends the execution of the laser processing program P, is "in course of laser processing". Once the operating state judging section 18 accurately judges the operating state R at the instant of suspending the program execution, the restart condition specifying section 20 is capable of appropriately setting the restart condition C of the laser processing unit 12 (i.e., the operating condition of the laser oscillator 32, the position of the processing head 34, etc.) when the execution of the laser processing program P is resumed. Several examples having a configuration in which the controller 14 is configured as a numerical control (NC) unit are described below.

For example, suppose that the laser processing unit 12 performs laser drilling on a mild steel thick plate workpiece W by using an oxygen assist gas, wherein after forming an unfinished hole by laser beam irradiation, the drilling process is progressed by continuing to blow the oxygen assist gas while stopping the laser beam irradiation. During the drilling by using only the assist gas, a "dwell" command for stopping the laser beam irradiation is written in the laser processing program P (i.e., NC program). When the execution of the laser processing program P is suspended in the above operating state R, and if the judgment on whether or not the operating state is in course of laser processing is performed based on the description of the laser processing program P, it may be judged that the operating state is not in course of laser processing, despite the fact that the drilling is actually performed, because the dwell command is written in the program. By contrast, the operating state judging section 18 is capable of judging whether or not the operating state is in course of laser processing, based on whether or not an assist gas supply command is being output from the controller 14, or alternatively, whether or not an assist gas supply monitoring signal is being input to the controller 14. Accordingly, even in the operating state R where the drilling was performed by using only the assist gas at the time of suspending the program execution, it is possible to accurately judge that the operating state R was in course of laser processing.

Suppose also that, in order to alleviate the overheating of the workpiece W during laser processing, the workpiece W is cooled by continuing to blow the assist gas thereto while stopping the laser beam irradiation. The cooling of the workpiece by using the assist gas affects the processing quality, and thus constitutes a part of the laser processing. Therefore, it should be considered that the operating state R of the laser processing unit 12 during the above cooling operation is in course of laser processing. When the execution of the laser processing program P is suspended in the above operating state R, it may also be erroneously judged that the operating state is not in course of laser processing based on the description of the laser processing program P, as in the case of the aforementioned drilling process using only the assist gas. By contrast, the operating state judging section 18 is capable of accurately judge that the operating state R was in course of laser processing.

Suppose also that, in order for the processing head 34 to avoid an obstacle during laser processing, the laser beam irradiation is stopped and, in this condition, the processing head 34 is retracted by a rapid-feed command using a linear or circular interpolation instead of the positioning of respective axes. The retracting operation of the processing head 34 does not affect the processing quality, and thus does not constitute a part of the laser processing. Therefore, it should be considered that the operating state R of the laser processing unit 12 during the above retracting operation is not in course of laser processing. When the execution of the laser processing program P is suspended in the above operating state R, and if the judgment on the operating state is performed based on the description of the laser processing program P, it may be erroneously judged that the operating state is in course of laser processing, despite the fact that the laser processing is not performed, because a feed command using a linear or circular interpolation is usually a command to be issued during laser processing. By contrast, the operating state judging section 18 is capable of judging whether or not the operating state is in course of laser processing, based on whether or not a gap control command is being output from the controller 14 in real time, or alternatively, whether or not a gap amount monitoring signal is being input to the controller 14 in real time. Accordingly, even in the operating state R in which the processing head 34 was retracted by a rapid-feed command irrelevant to the gap control at the time of suspending the program execution, it is possible to accurately judge that the operating state R was not in course of laser processing.

Figure 3:
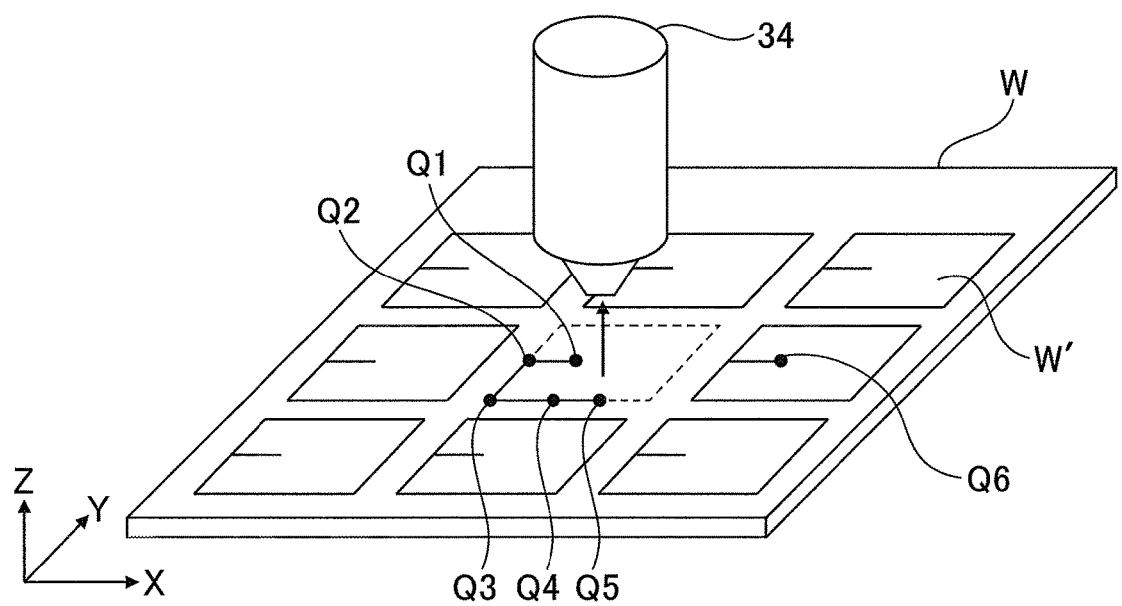
FIG. 3 is a diagram schematically illustrating one example of laser processing capable of being performed by the laser processing system.

FIG. 3 schematically illustrates one example of laser processing capable of being performed by the laser processing system 10, 30. A procedure for specifying the restart condition C of the laser processing unit 12 (FIGS. 1 and 2), which is performed by the restart condition specifying section 20 (FIG. 1) of the restart preparation apparatus 16, will be described below with reference to FIG. 3.

Generally, in laser processing, the moving velocity of a point to be processed on a workpiece (i.e., a processing velocity) is set to an appropriate velocity at which heat input of the laser beam balances with heat output due to melting, thermal conduction, etc., at the processed point. Further, in order to ensure acceleration to a desired processing velocity while maintaining a balance between the heat input and the heat output, a processing condition for a process starting point may be set to a special condition different from a processing condition during a constant velocity processing. As a result, if the processing stops due to the suspension of the laser processing program at the process starting point or during the constant velocity processing, processing defects may occur due to the stopping of the processing itself, and when the processing is restarted from the processing point at which the program execution was suspended, additional processing defects may occur.

The example of processing shown in FIG. 3 has a configuration in which a plurality of rectangular plates W' are fabricated by performing a laser cutting to a plate-like workpiece W in accordance with a laser processing program P (FIG. 1) provided as an NC program. More specifically, after performing a piercing at a predetermined position Q1 inside the contour of a rectangular plate W', the processing head 34 starts the laser cutting from the pierced hole, and moves the processing point to Q2 to Q3 to Q4 to Q5 . . . , in this order, along a processing path corresponding to the contour of the rectangular plate W'. FIG. 3 shows a state in which the execution of the laser processing program P is suspended at the position Q5 defined in the laser processing along the processing path and the processing head 34 is retracted. In this state, it is difficult for the aforementioned reason to restart the processing at the position Q5, and the rectangular workpiece W' is not produced when the processing is restarted at a position in a non-processed portion of the processing path. Therefore, it is usually considered that the processing is restarted from any one of following positions (I) to (IV):

(I) Position Q4 immediately preceding position Q5 at which the execution of the laser processing program P is suspended.

(II) Position Q3 of a start point of a block (i.e., a statement: regarding linear interpolation, in the illustrated example) that includes position Q5 at which the execution of the laser processing program P is suspended.

(III) Position Q2 of a start point of a block (i.e., a statement: regarding linear interpolation, in the illustrated example) that precedes a block including position Q5 at which the execution of the laser processing program P is suspended.

(IV) Position Q6 of a process starting point of a processing path subsequent to a processing path including position Q5 at which the execution of the laser processing program P is suspended.

In the laser processing system 10, 30, the restart condition specifying section 20 of the restart preparation apparatus 16 (FIG. 1) specifies the restart condition C (i.e., the position of the processing head 34) of the laser processing unit 12 (FIGS. 1 and 2) when the execution of the laser processing program P is resumed, from among the above positions (I) to (IV) defined as the predetermined conditions described in the laser processing program P, depending on the material or thickness of the workpiece W, the procedure or required processing quality of the laser processing, etc. In this connection, the selection of positions (I) to (IV) specified as the restart condition C by the restart condition specifying section 20 may be, e.g., provided as a rule defined when designing the laser processing system, or appropriately performed by an operator at the instant of suspending the program execution so that the selected position is instructed to the restart preparation apparatus 16. For example, if some degree of overlapped processing of the workpiece W along the processing path is allowed, one of positions (I) to (III) may be provided or selected as the restart condition C. The position (I) ensures a shortest overlapped processing-path distance, but since a control becomes relatively complex if the laser processing program P is resumed at (I), position (II) or (III) may preferably be provided or selected. If overlapped processing of the workpiece W is not allowed, the position (IV) is provided or selected.

When the restart condition specifying section 20 specifies one of positions (I) to (IV) as the restart condition C in accordance with the above rule or instruction, the controller 14 performs a control to move the processing head 34 to the specified position of one of (I) to (IV). At respective positions (I) to (IV), the other restart condition necessary for restarting the processing, such as the operating condition of the laser oscillator 32, is set as a predetermined condition in the laser processing program P. Therefore, when the controller 14 restart the laser processing unit 12 at any one of positions (I) to (IV), the laser processing is restarted in accordance with the laser processing program P.

In the laser processing system 10, 30, if the execution of the laser processing program P is suspended when the operating state R of the laser processing unit 12 is not in course of laser processing, the restart condition specifying section 20 specifies the restart condition C as a condition at the time of suspending the program execution (i.e., the position of the processing head 34) from among predetermined conditions defined in the laser processing program P. Based on the specified restart condition C, the controller 14 locates the processing head 34 at a position identical to a position at which the program execution is suspended, and restarts the laser processing unit 12. In the processing example of FIG. 3, for example, a state wherein a fast feed command for moving the processing head 34 from the process ending point of one rectangular plate W' to the process starting point of the subsequent rectangular plate W' is being output from the controller 14, is considered as the operating state R of the laser processing unit 12 not in course of laser processing.

In this way, in the laser processing system 10, 30, the operating state judging section 18 of the restart preparation apparatus 16 is capable of accurately judging whether or not the operating state R of the laser processing unit 12, at the instant when the execution of the laser processing program P is suspended, is in course of laser processing, and thereby the restart condition specifying section 20 of the restart preparation apparatus 16 is capable of appropriately determining the restart condition C (i.e., the operating condition of the laser oscillator 32, the position of the processing head 34, etc.) of the laser processing unit 12 when the execution of the laser processing program P is resumed, depending on the operating state R of the laser processing unit 12 at the instant of suspending the program execution. As a result, in the laser processing system 10, 30, it is possible to reduce the influence on the processing quality of a portion to be processed on the workpiece W due to the program suspension and the subsequent program resumption.

The judgment procedure of the operating state R is configured so that the operating state judging section 18 monitors the output, from the controller 14, of a predetermined operation command required for the laser processing, or alternatively, the input, to the controller 14, of predetermined external information required for the laser processing, and judges the operating state R based on whether or not the output or input is performed in real time, and therefore it is not necessary to add an extra judging means to the existing laser processing system. Consequently, it is possible to facilitate a design of a control, a provision of a program and an operation of a system, required for the laser processing. Further, the operating state judging section 18 monitors the current state of a system component involved in the laser processing, and therefore the restart preparation apparatus 16 is capable of easily and quickly reproducing the operating state R at the instant of suspending the program execution, without performing a troublesome work such as to reproduce the operating state R at the instant of suspending the program execution by further executing the laser processing program P from the beginning, and thus of efficiently making the preparations for the program resumption. Furthermore, in contrast to a procedure for judging the operating state R at the instant of suspending the program execution based on the description of the laser processing program P, it is possible to eliminate a time lag arising due to a program decoding or calculation, and thereby to further accurately judge whether or not the operating state R is in course of laser processing.

In the laser processing system 10, 30, the operating state judging section 18 may monitor the output, from the controller 14, of a predetermined single operation command (e.g., an assist gas supply command, a shutter open command or a gap control command) or the input, to the controller 14, of a predetermined single external information (e.g., an assist gas supply monitoring signal, a shutter open monitoring signal or a gap amount monitoring signal), and judge that the operating state R is in course of laser processing when the output or input is performed in real time. In this connection, the selection of the operation command or external information used by the operating state judging section 18 for judging the operating state R may be performed in advance by, e.g., a designer of the laser processing system 10, 30, depending on the mechanical configuration of the laser processing unit 12 or the type of the laser processing to be performed.

Alternatively, the operating state judging section 18 may monitor the output, from the controller 14, of different types of operation commands required for the laser processing unit 12 to process the workpiece W, and judge that the operating state R is in course of laser processing, in a case where at least one operation command in a group of the different operation commands is being output as the predetermined operation command from the controller 14 in real time. In this configuration, the different types of operation commands included in the group may be two or more commands selected from among the assist gas supply command, the shutter open command and the gap control command.

Further, the operating state judging section 18 may monitor the input, to the controller 14, of different types of external information required for the laser processing unit 12 to process the workpiece W, and judge that the operating state R is in course of laser processing, in a case where at least one external information in a group of the different external information is being input as the predetermined external information to the controller 14 in real time. In this configuration, the different types of external information included in the group may be two or more signals selected from among the assist gas monitoring signal, the shutter open monitoring signal and the gap amount monitoring signal.

The above configuration wherein the operating state R is judged based on the different types of operation commands or external information, improves the reliability of the judgment. The selection of the group of any types of operation commands or any types of external information, used by the operating state judging section 18 for judging the operating state R, may be performed in advance by, e.g., a designer of the laser processing system 10, 30, depending on the mechanical configuration of the laser processing unit 12 or the type of the laser processing to be performed.

Figure 4:
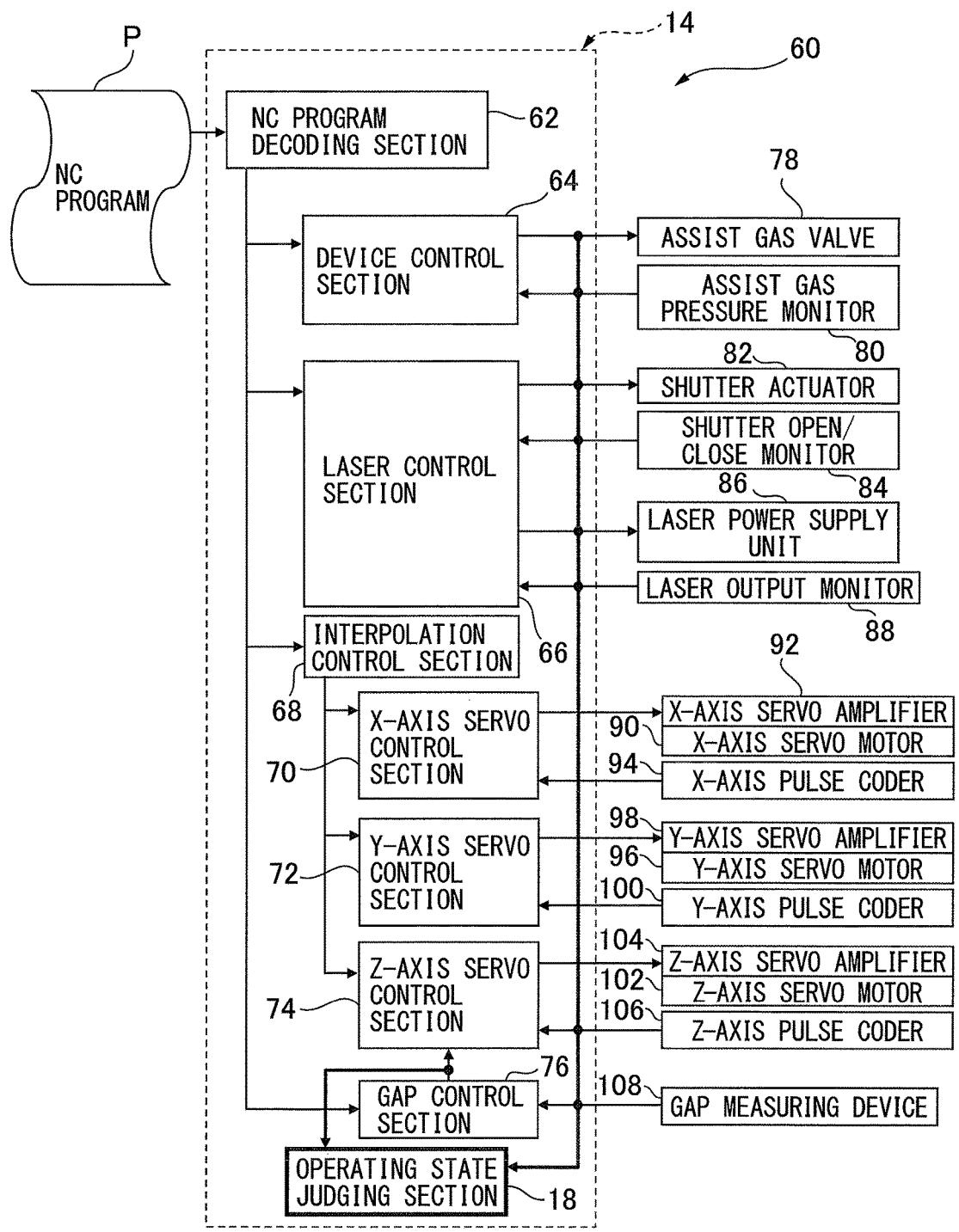
FIG. 4 is a functional block diagram showing the control configuration of a laser processing system according to another embodiment.

FIG. 4 is a functional block diagram showing mainly the control configuration of a laser processing system 60 according to another embodiment, which has a configuration corresponding to that of the laser processing system 30 of FIG. 2. In FIG. 4, components corresponding to those of the laser processing systems 10 and 30 shown in FIGS. 1 and 2 are designated by the same reference numerals. In the laser processing system 60, the controller 14 is configured as a numerical control (NC) unit, and the laser processing program P configured as an NC program is given to the controller 14. The restart preparation apparatus 16 (FIGS. 1 and 2) is configured as one of the functions of the controller 14. In FIG. 4, the operating state judging section 18 is shown as one function of the controller 14.

The controller 14 includes an NC program decoding section 62 configured to decode the laser processing program P; and also includes a device control section 64, a laser control section 66, an interpolation control section 68, an X-axis servo control section 70, a Y-axis servo control section 72, a Z-axis servo control section 74 and a gap control section 76, which respectively calculate the manipulating variables of various controlled objects based on the decoded laser processing program P. The device control section 64 calculates, based on the laser processing program P, the manipulating variable of an assist gas valve 78 constituting a supply control section of the gas supply source 48 (FIG. 2), and outputs the manipulating variable as an assist gas supply command to the assist gas valve 78. Also, an assist gas supply monitoring signal is input to the device control section 64 from an assist gas pressure monitor 80 constituting an assist gas pressure measuring device provided to the processing head 34 (FIG. 2).

The laser control section 66 calculates, based on the laser processing program P, the manipulating variable of a shutter actuator 82 constituting an open/close control section for the shutter 42 (FIG. 2), and outputs the manipulating variable as a shutter open command to the shutter actuator 82. Also, a shutter open monitoring signal is input to the laser control section 66 from a shutter open/close monitor 84 constituting an open/close detector of the shutter 42 (FIG. 2). The laser control section 66 also calculates, based on the laser processing program P, the manipulating variable of a laser power supply unit 86 constituting a control section of the power supply 38, and outputs the manipulating variable as a laser output command to the laser power supply unit 86. Also, a laser output monitoring signal is input to the laser control section 66 from a laser output monitor 88.

The interpolation control section 68 calculates, based on the laser processing program P, the manipulating variables of linear or circular interpolation relating to the three control axes (X axis, Y axis and Z axis) provided in the driving mechanism 36 (FIG. 2), and gives the manipulating variables of interpolation to the X-axis servo control section 70, the Y-axis servo control section 72 and the Z-axis servo control section 74, respectively. The X-axis servo control section 70 calculates, based on the given manipulating variable of interpolation, the manipulating variable of an X-axis servo motor 90 configured as the driving mechanism 36, and outputs the calculated manipulating variable to an X-axis servo amplifier 92 configured as the driving mechanism 36. Also, an X-axis position monitoring signal is input to the X-axis servo control section 70 from an X-axis pulse coder 94 attached to the X-axis servo motor 90. The Y-axis servo control section 72 calculates, based on the given manipulating variable of interpolation, the manipulating variable of a Y-axis servo motor 96 configured as the driving mechanism 36, and outputs the calculated manipulating variable to a Y-axis servo amplifier 98 configured as the driving mechanism 36. Also, a Y-axis position monitoring signal is input to the Y-axis servo control section 72 from a Y-axis pulse coder 100 attached to the Y-axis servo motor 96. The Z-axis servo control section 74 calculates, based on the given manipulating variable of interpolation, the manipulating variable of a Z-axis servo motor 102 configured as the driving mechanism 36, and outputs the calculated manipulating variable to a Z-axis servo amplifier 104 configured as the driving mechanism 36. Also, a Z-axis position monitoring signal is input to the Z-axis servo control section 74 from a Z-axis pulse coder 106 attached to the Z-axis servo motor 102.

The gap control section 76 calculates, based on the laser processing program P, the manipulating variable of the Z-axis servo motor 102 in order to maintain the gap G (FIG. 2) at a target value, and gives the manipulating variable to the Z-axis servo control section 74. The Z-axis servo control section 74 outputs the calculated manipulating variable as a gap control command to the Z-axis servo amplifier 104. A gap amount monitoring signal is input to the gap control section 76 from a gap measuring device 108.

In the laser processing system 60, the operating state judging section 18 configured as one function of the controller 14 monitors the output, from the controller 14, of a predetermined operation command (i.e., an assist gas supply command, a shutter open command, a gap control command, or a desired combination thereof) required for the laser processing unit 12 (FIGS. 1 and 2) to process the workpiece W (FIGS. 1 and 2), and judges that, in the case where the predetermined operation command is being output from the controller 14 at the instant when the execution of the laser machining program P is suspended, the operating state R of the laser processing unit 12 at the instant of suspending the program execution is in course of laser processing. Further, the operating state judging section 18 monitors the input, to the controller 14, of predetermined external information (i.e., an assist gas supply monitoring signal, a shutter open monitoring signal, a gap amount monitoring signal, or a desired combination thereof) required for the laser processing unit 12 (FIGS. 1 and 2) to process the workpiece W (FIGS. 1 and 2), and judges that, in the case where the predetermined external information is being input to the controller 14 at the instant when the execution of the laser processing program P is suspended, the operating state R of the laser processing unit 12 at the instant of suspending the program execution is in course of laser processing. On the other hand, in the case where no operation command is output from the controller 14 and no external information is input to the controller 14 at the instant when the execution of the laser processing program P is suspended, the operating state judging section 18 judges that the operating state R of the laser processing unit 12 at the instant of suspending the program execution is not in course of laser processing.

Figure 5:
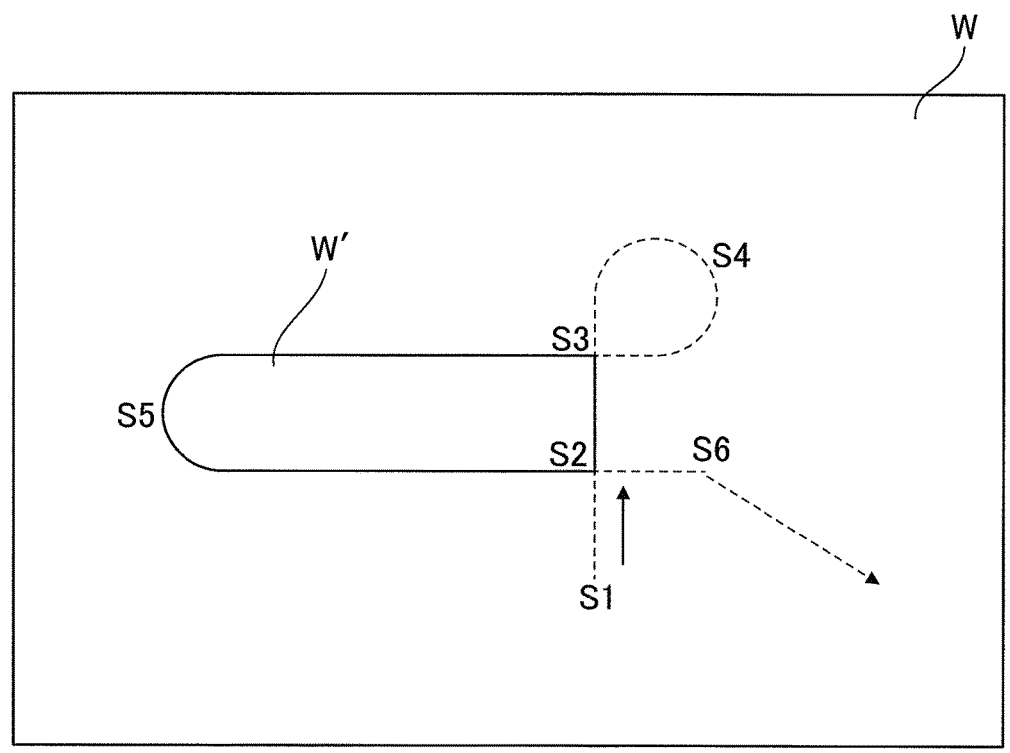
FIG. 5 is a diagram schematically illustrating another example of laser processing capable of being performed by the laser processing system.
Figure 6:
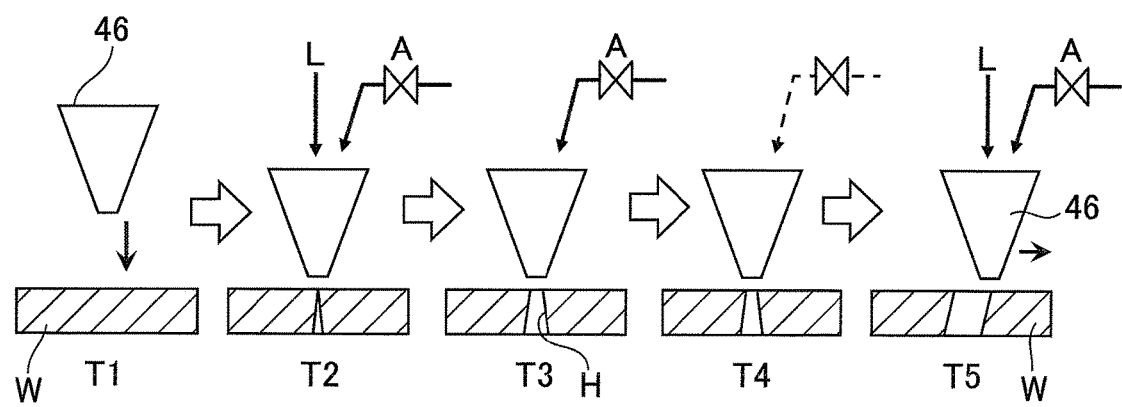
FIG. 6 is a diagram schematically illustrating a further example of laser processing capable of being performed by the laser processing system.
Figure 7:
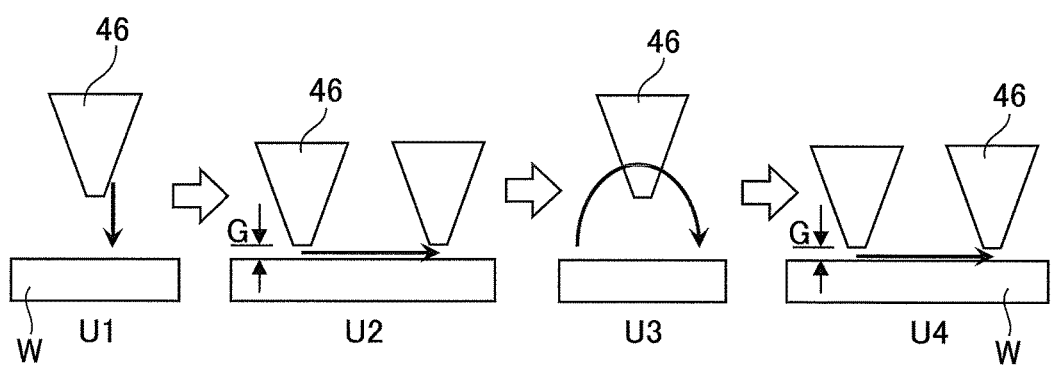
FIG. 7 is a diagram schematically illustrating a yet further example of laser processing capable of being performed by the laser processing system.

FIGS. 5 to 7 schematically illustrate other examples of laser processing capable of being performed by the laser processing system 10, 30, 60. Further examples of the preparation process performed by the restart preparation apparatus 16 will be described below with reference to FIGS. 5 to 7.

The example of processing shown in FIG. 5 has a configuration in which a plate W' having a shape illustrated by a solid line is fabricated by performing a laser cutting to a plate-like workpiece W in accordance with the laser processing program P (FIG. 4) provided as an NC program. The processing head 34 (FIG. 2) moves from S1 to S2 to S3 to S4 to S3 to S5 to S2 to S6 to . . . , in this order, along a processing path corresponding to the contour of the plate W', in accordance with an interpolation command. The laser processing program P describing the illustrated example of processing is provided so as to prevent a cutting quality from degrading due to heat concentration at the corner of the plate W', and includes a process from S1 to S2 for an acceleration with no laser oscillation, a process at S2 starting laser oscillation, a process from S2 to S3 for a laser cutting with moving at a constant velocity, a process from S3 to S4 to S3 for a feed motion with no laser oscillation, a process from S3 to S5 to S2 for a laser cutting with moving at a constant velocity, a process at S2 stopping laser oscillation, and a process at S6 completing the processing of the plate W', in this order. Since S2 is neither a process starting point nor a process ending point, it is possible to prevent the laser cutting from being performed at low velocity during acceleration or deceleration. Further, since S3 does not need a deceleration, it is possible to prevent the laser cutting from being performed on the corner and the vicinity thereof at low velocity. As a result, the processing quality at S2 and S3 and the vicinity thereof become comparable with that of the other portions. In this example, the workpiece W may be provided as a cold-rolled steel plate with 1 mm thickness, the power of the laser beam generated in the laser oscillator 32 (FIG. 2) may be provided as 1 kW, and the assist gas blown from the processing head 34 (FIG. 2) to the workpiece W may be provided as an oxygen gas.

In the above example of processing, since the process from S1 to S2 and the process from S3 to S4 to S3 are performed without irradiating the workpiece W with the laser beam, no instruction for laser oscillation is written in the laser machining program P for these processes. However, in the case where the execution of the laser processing program P is suspended during the process from S1 to S2 or the process from S3 to S4 to S3, and if the laser processing unit 12 (FIGS. 1 and 2) is restarted at S2 or S3 (subsequent to S4), it may be difficult to obtain a desired cutting quality because a cutting velocity immediately after S2 or S3 does not reach a commanded velocity.

In view of this, the operating state judging section 18 of the restart preparation apparatus 16 (FIGS. 1 and 2) judges that the operating state R (FIG. 1) at the instant of suspending the program execution, occurring as described above, is in course of laser processing, in the case where the assist gas supply command is being output from the controller 14 (FIGS. 1 and 2) or the assist gas supply monitoring signal is being input to the controller 14 at the above-described instant of suspending the program execution. In the above example of processing, the assist gas supply command is being output to the assist gas valve 78 (FIG. 4) and the assist gas supply monitoring signal is being input from the assist gas pressure monitor 80 (FIG. 4), throughout the processes from S1 to S2 to S3 to S4 to S3 to S5 to S2. Accordingly, if the execution of the laser processing program P is suspended during the process from S1 to S2 or the process from S3 to S4 to S3, the operating state judging section 18 judges that the operating state R at the instant of suspending the program execution is in course of laser processing.

Then, the restart condition specifying section 20 (FIG. 1) specifies an appropriate restart condition C from among the aforementioned options (I) to (IV) as the restart condition C to be selected when the operating state R at the instant of suspending the program execution is in course of laser processing. For example, option (III) may be specified as the restart condition C so as to return to S1 and restart the laser processing unit 12, or alternatively, option (IV) may be specified as the restart condition C so as to restart the laser processing unit 12 at a process starting point (corresponding to S1) of a subsequent plate W' to be cut.

Alternatively, the operating state judging section 18 judges that the operating state R at the above-described instant of suspending the program execution is in course of laser processing, in the case where the shutter open command is being output from the controller 14 or the shutter open monitoring signal is being input to the controller 14 at the above-described instant of suspending the program execution. In the above example of processing, the shutter open command is being output to the shutter actuator 82 (FIG. 4) and the shutter open monitoring signal is being input from the shutter open/close monitor 84 (FIG. 4), throughout the processes from S1 to S2 to S3 to S4 to S3 to S5 to S2 to S6. Accordingly, if the execution of the laser processing program P is suspended during the process from S1 to S2 or the process from S3 to S4 to S3, the operating state judging section 18 judges that the operating state R at the instant of suspending the program execution is in course of laser processing.

In this connection, the open/close timing of the shutter 42 (FIG. 2) may be suitably set by the laser processing program P. For example, the shutter 42 may be closed during a state where the laser oscillator 32 does not perform a laser oscillation beyond a predetermined time, such as a period for the exchange of the workpiece W, for a translation from the process ending point of one product to the process starting point of the subsequent product, etc. During a period when the laser oscillation is stopped only for a short time, such as the process from S3 to S4 to S3 in the above example of processing, the shutter 42 may be left open.

Alternatively, the operating state judging section 18 judges that the operating state R at the above-described instant of suspending the program execution is in course of laser processing, in the case where the gap control command is being output from the controller 14 or the gap amount monitoring signal is being input to the controller 14 at the above-described instant of suspending the program execution. In the above example of processing, the gap control command is being output to the Z-axis servo amplifier 104 (FIG. 4) and the gap amount monitoring signal is being input from the gap measuring device 108 (FIG. 4), throughout the processes from S1 to S2 to S3 to S4 to S3 to S5 to S2 to S6. Accordingly, if the execution of the laser processing program P is suspended during the process from S1 to S2 or the process from S3 to S4 to S3, the operating state judging section 18 judges that the operating state R at the instant of suspending the program execution is in course of laser processing.

In the above example of processing, it is possible to cut the plate W' in a short time by the acceleration in the process from S1 to S2 and the movement at a constant velocity during the subsequent processes from S2 to S3 to S4 to S3 to S5 to S2 to S6. The gap control is performed during the process from S3 to S4 to S3 with no laser oscillation, in the same manner as a process involving the laser oscillation, and thereby it becomes possible to ensure the movement at a constant velocity after S2. The above-described movement during the period when the laser oscillation is stopped affects the processing quality, and thus constitutes a part of the laser processing, and therefore, the operating state R of the laser processing unit 12 during the above movement is accurately judged by the operating state judging section 18 as to be in course of laser processing.

In other cases, the processing head 34 is temporarily retracted during the process from S3 to S4 to S3, by not performing a gap control or by performing a gap control so as to enlarge the gap G (FIG. 2). In this case, the processing head 34 is decelerated and accelerated during the process from S3 to S4 to S3 in order to maintain the processing quality. Also in this case, the operating state judging section 18 compares the gap amount monitoring signal input to the controller 14 with a predetermined threshold value, and judges that the operating state R at the instant of suspending the program execution is in course of laser processing, in the case where the gap amount is not larger than the threshold value (i.e., during processes other than the process from S3 to S4 to S3).

The example of processing shown in FIG. 6 has a configuration in which a plate-like workpiece W is subjected to a piercing in accordance with the laser processing program P (FIG. 4) provided as an NC program. The illustrated example of processing includes the following steps T1 to T5 for making a hole H with a relatively large diameter in the workpiece W in a relatively short time. In this example, the workpiece W may be provided as a mild steel plate with 6 mm thickness, and the assist gas blown from the processing nozzle 46 to the workpiece W may be provided as an oxygen gas.

Step T1:
Prior to laser oscillation, the processing nozzle 46 moves closer to the workpiece W, and the shutter 42 provided to the laser oscillator 32 (FIG. 2) opens.

Step T2:
Assist gas A is blown from the processing nozzle 46 to the workpiece W, and when the internal pressure of the processing nozzle 46 reaches a predetermined gas pressure, the workpiece W is irradiated with laser beam L for 0.3 seconds. The surface of the workpiece W heated by the laser beam L burns in an atmosphere of high-density assist gas.

Step T3:
The laser beam irradiation is stopped, and the assist gas A is continued to be blown to the workpiece W for about 0.7 seconds. Thereby the burning progresses to form the hole H.

Step T4:
The supply of the assist gas is stopped to terminate a burning reaction, and thereby the formation of the hole H is finished. Once the workpiece W is cooled by being left in this state for about 0.4 seconds, no burning occurs even if the assist gas is supplied.

Step T5:
The irradiation with the laser beam L to the workpiece W and the supply of the assist gas are resumed and, beginning at the hole H, the laser processing is started by moving the processing nozzle 46 and the workpiece W relative to each other.

In the above example of processing, no instruction for laser oscillation is written in the laser processing program P for step T3 or T4 during which the laser beam L is not emitted. However, in the case where the execution of the laser processing program P is suspended during step T3 or T4, the hole H is incompletely formed, so that if the laser processing unit (FIGS. 1 and 2) is restarted from step T5, the subsequent laser cutting may cause processing defects because a process starting point is set at the uncompleted hole H.

In view of this, the operating state judging section 18 of the restart preparation apparatus 16 judges that the operating state R at the instant of suspending the program execution, occurring as described above, is in course of laser processing, in the case where the shutter open command is being output from the controller 14 or the shutter open monitoring signal is being input to the controller 14 at the above-described instant of suspending the program execution. In the above example of processing, the shutter open command is being output to the shutter actuator 82 (FIG. 4) and the shutter open monitoring signal is being input from the shutter open/close monitor 84 (FIG. 4), throughout steps T3 and T4. Accordingly, if the execution of the laser processing program P is suspended during step T3 or T4, the operating state judging section 18 judges that the operating state R at the instant of suspending the program execution is in course of laser processing.

Then, the restart condition specifying section 20 (FIG. 1) specifies an appropriate restart condition C from among the aforementioned options (I) to (IV) as the restart condition C to be selected when the operating state R at the instant of suspending the program execution is in course of laser processing. For example, option (III) may be specified as the restart condition C so as to return to the initial position of step T1 and restart the laser processing unit 12 at the initial position.

Alternatively, the operating state judging section 18 judges that the operating state R at the above-described instant of suspending the program execution is in course of laser processing, in the case where the assist gas supply command is being output from the controller 14 or the assist gas supply monitoring signal is being input to the controller 14 at the above-described instant of suspending the program execution. In the above example of processing, when the assist gas supply is stopped in step T4, the pressure of the assist gas remaining inside the processing nozzle 46 gradually decreases, and thereby the burning reaction stops. Accordingly, in the case where the execution of the laser processing program P is suspended during step T3 or T4, the operating state judging section 18 compares the assist gas supply monitoring signal with a predetermined threshold value and, if the assist gas pressure is higher than the threshold value, judges that the operating state R at the instant of suspending the program execution is in course of laser processing.

The example of processing shown in FIG. 7 has a configuration in which a plate-like workpiece W is subjected to a laser welding or a heat treatment in accordance with the laser processing program P (FIG. 4) provided as an NC program, and includes the following steps U1 to U4. In this example, the workpiece W may be provided as a mild steel plate with 1 mm thickness.

Step U1:
Prior to laser oscillation, the processing nozzle 45 moves from a predetermined position closer to the workpiece W, and the shutter 42 provided to the laser oscillator 32 (FIG. 2) opens. The movement of the processing nozzle 45 from the predetermined position to a position closer to the workpiece W is performed under a gap control.

Step U2:
After the gap G reaches a target value, the laser beam irradiation is started, the processing nozzle 46 is moved in accordance with an interpolation command while performing the gap control, so as to perform the laser welding or heat treatment on the workpiece W.

Step U3:
After completing the processing operation along one processing path, the laser oscillation is stopped, and the processing nozzle 46 is moved to a process starting point of the subsequent processing path in accordance with an interpolation command. At this time, in order to, e.g., avoid an obstacle, the gap control is interrupted, and the processing nozzle 46 is controlled to retract upward until a gap amount larger than the gap target value is obtained. After passing the obstacle, the gap control is resumed, and the processing nozzle 46 is moved closer to the workpiece 46 until the gap target value is reached.

Step U4:
After the gap G reaches the target value, the laser beam irradiation is started, and the processing nozzle 46 is moved in accordance with an interpolation command while performing the gap control, so as to perform the laser welding or heat treatment along the subsequent processing path.

In the above example of processing, no instruction for laser oscillation is written in the laser processing program P for step U1 or U3 during which the laser beam L is not emitted. However, in the case where the execution of the laser processing program P is suspended during step U1, the gap G has not yet reached the target value, so that if the laser processing unit (FIGS. 1 and 2) is restarted from step U2, a subsequent process performed until the gap G reaches the target value may cause processing defects.

In view of this, the operating state judging section 18 of the restart preparation apparatus 16 judges that the operating state R at the instant of suspending the program execution, occurring as described above, is in course of laser processing, in the case where the gap control command is being output from the controller 14 or the gap amount monitoring signal is being input to the controller 14 at the above-described instant of suspending the program execution. In the above example of processing, the gap control command is being output to the Z-axis servo amplifier 104 (FIG. 4) and the gap amount monitoring signal is being input from the gap measuring device 108 (FIG. 4), throughout steps U1 and U3 (provided that the gap control is being performed). Accordingly, if the execution of the laser processing program P is suspended during step U1 or U3 (provided that the gap control is being performed), the operating state judging section 18 judges that the operating state R at the instant of suspending the program execution is in course of laser processing.

Then, the restart condition specifying section 20 (FIG. 1) specifies an appropriate restart condition C from among the aforementioned options (I) to (IV) as the restart condition C to be selected when the operating state R at the instant of suspending the program execution is in course of laser processing. For example, option (III) may be specified as the restart condition C so as to return to the initial position of step U1 and restart the laser processing unit 12 at the initial position.

In the case where the laser processing system 10, 30, 60 is provided with, e.g., a high-power laser oscillator 32 (FIG. 2), the power of the laser beam may be unstable until the thermal condition of the laser oscillator 32 becomes stable. To address this problem, prior to the series of laser processing steps as shown, e.g., in FIGS. 3 and 5 to 7, the system may be controlled in such a manner that laser oscillation is started while keeping the shutter 42 (FIG. 2) closed, thereby allowing the laser beam to be absorbed in a laser absorber incorporated in the laser oscillator 32 so as to suitably warm up the laser oscillator 32, and thereafter the shutter 42 is opened and the laser beam is emitted from the processing head 34 (FIG. 2). In this case, the laser oscillation performed while keeping the shutter 42 closed should also be considered as a part of the laser processing.

In view of the above, the laser processing system 10, 30, 60 may be configured so that if the predetermined operation command (an assist gas supply command, a shutter open command or a gap control command) is not being output from the controller 14 (FIGS. 1 and 2), and the predetermined external information (an assist gas supply monitoring signal, a shutter open monitoring signal or a gap amount monitoring signal) is not being input to the controller 14, the operating state judging section 18 judges that the operating state R is in course of laser processing, in the case where a laser oscillation command is being output from the controller 14 to the laser power supply unit 86 (FIG. 4), or alternatively, a laser output monitoring signal from the laser output monitor 88 or a laser processing instruction written in the laser processing program P is being input to the controller 14. According to this configuration, it is possible for the operating state judging section 18 to judge not only the operating state R in which the shutter 42 is opened, but also the operating state R in which the laser oscillation is performed while the shutter 42 is closed, as being in course of laser processing.

Further, the laser processing system 10, 30, 60 may be configured so that the restart preparation apparatus 16 (FIG. 1) automatically performs the aforementioned preparation process when a reason for suspending the execution of the laser processing program P (FIG. 1) is resolved, so that the restart condition specifying section 20 (FIG. 1) automatically specifies the restart condition C (FIG. 1), and the controller 14 (FIG. 1) controls the laser processing unit 12 (FIG. 1) so as to wait at a position where the laser processing unit 12 restarts under the restart condition C, until a resume instruction for resuming the execution of the laser processing program P is provided.

According to this configuration, in the series of laser processing steps as shown, e.g., in FIGS. 3 and 5 to 7, when the reason (such as power outage) for suspending the execution of the laser processing program P is resolved after the suspension of the program execution, the laser processing unit 12 is automatically located at the position where it restarts under the restart condition C. Then, by, e.g., an operator, it is confirmed that the execution of the laser processing program P can be safely resumed by making sure that the laser processing unit 12 is subjected to no functional problem, that the safety of a working space of the laser processing unit 12 is ensured, etc., and thereafter a resume instruction is given to the controller 14. Since the laser processing unit 12 is restarted based on the given resume instruction, it is possible to ensure the safety after the program execution is resumed.

Furthermore, the laser processing system 10, 30, 60 may be configured so that the operating state judging section 18 selects the predetermined operation command or the predetermined external information, depending on a type of the laser processing described in the laser processing program P, and performs judgment of the operating state R based on the operation command or external information as selected. According to this configuration, in the case where, e.g., the laser processing unit 12 (FIG. 1) sequentially performs different laser processing on different types of workpieces W having different materials or dimensions, when the execution of any one of the laser processing programs P is suspended, it is possible to accurately judge the operating state R at the instant of suspending the program execution by selecting the operation command or external information appropriate for the type of processing described in the laser processing program P.

The correlation between the aforementioned predetermined operation command or aforementioned predetermined external information and the type of the laser processing may be interpreted, e.g., as follows:

(i) Assist gas supply command or assist gas supply monitoring signal:

Preferable as a criterion of judgement of the operating state R at the instant of suspending the program execution, for a laser processing that requires a high-pressure assist gas or high-purity assist gas. For example, a high-pressure nitrogen gas is required to process a thick stainless steel plate, and a high-purity oxygen gas is required to process a thick mild steel plate. In the case of high-pressure nitrogen gas, it takes time to increase an assist gas pressure in a processing head to a target value prior to starting laser oscillation. In the case of high-purity oxygen gas, it takes time to increase the purity of an assist gas to a target value, by evacuating air from an assist gas piping or a processing head, prior to starting laser oscillation. By judging the above precedent operations as "in course of laser processing", it is possible to perform an appropriate restart preparation process.

(ii) Shutter open command or shutter open monitoring signal:

Preferable as a criterion of judgement of the operating state R at the instant of suspending the program execution, for any general laser processing. However, in order to, e.g., purposely shorten the cycle time of laser processing due to the mechanical configuration of the laser processing unit 12 (FIG. 1), the shutter 42 (FIG. 2) may be opened even in a situation not corresponding to the aforementioned precedent or subsequent operation (e.g., translation from a process ending point to a subsequent process starting point). In this case, it is desirable not to use the shutter open command or shutter open monitoring signal as the criterion for judgment of the operating state R.

(iii) Gap control command or gap amount monitoring signal:

Preferable as a criterion of judgement of the operating state R at the instant of suspending the program execution, for any general laser processing. However, when a mild steel plate is subjected to piercing, laser oscillation may be started at a position defining a gap amount comparable to that defined when a nozzle is retracted. Furthermore, when a painted steel plate is subjected to cutting, the laser beam may be irradiated along a cutting path while maintaining a gap amount larger than that defined when a nozzle is retracted, in order to remove the painting prior to the cutting. In this case, it is desirable not to use the gap control command or gap amount monitoring signal as the criterion for judgment of the operating state R.

(iv) Laser output command, or alternatively, laser output monitoring signal or laser processing instruction:

The instruction, command or feedback signal, concerned with the laser oscillation, may cause an erroneous judgment of the operating state R if used alone, and thus is preferably used in combination with any one of (i) to (iii). However, in the case where the material of the workpiece W is wood, paper, cloth, etc., good cutting performance can be expected by merely irradiating the workpiece W with the laser beam, irrespective of the situation of the operation command or external information of (i) to (iii), and therefore the laser output command, laser output monitoring signal or laser processing instruction may be used alone as a criterion of judgement of the operating state R.

While the embodiments of the present invention have been described above, it will be appreciated that the present invention is not limited to the above-described embodiments. For example, the predetermined operation command or predetermined external information, used as a criterion of judgement of the operating state R at the instant of suspending the program execution, is not limited to (i) to (iv).

The invention claimed is:

1. A laser processing system comprising:
a laser processing unit including a laser oscillator and a processing head for irradiating a workpiece with a laser; and
a controller including a processor configured to control said laser processing unit in accordance with a given laser processing program to perform a preparation process to resume execution of said laser processing program after said execution is suspended,
wherein the controller functions to:
judge whether or not an operating state of said laser processing unit, at an instant when execution of said laser processing program is suspended, is in course of laser processing;
specify a restart condition of said laser processing unit when execution of said laser processing program is resumed, from among predetermined conditions given in said laser processing program, based on a result of the judgment; and
wherein the controller is configured to judge that said operating state is in course of laser processing, at the instant when execution of said laser processing program is suspended, by monitoring a state where:
1) a predetermined operation command required for said laser processing unit to process said workpiece is output from said controller:
1a) wherein in response to the laser processing program being suspended before the laser processing unit irradiates the workpiece with the laser, said predetermined operation command includes an operation command for controlling a precedent operation of the laser processing unit,
1b) wherein in response to the laser processing program being suspended while the laser processing unit irradiates the workpiece with the laser, said predetermined operation command includes an operation command for controlling an irradiating operation of the laser processing unit, and
1c) wherein in response to the laser processing program being suspended after the laser processing unit irradiates the workpiece with the laser, said predetermined operation command includes an operation command for controlling a subsequent operation of the laser processing unit, or
2) a predetermined external information required for said laser processing unit to process said workpiece is input to said controller:
2a) wherein in response to the laser processing program being suspended before the laser processing unit irradiates the workpiece with the laser, said predetermined external information includes external information for controlling the precedent operation of the laser processing unit,
2b) wherein in response to the laser processing program being suspended while the laser processing unit irradiates the workpiece with the laser, said predetermined external information includes external information for controlling the irradiating operation of the laser processing unit, and
2c) wherein in response to the laser processing program being suspended after the laser processing unit irradiates the workpiece with the laser, said predetermined external information includes external information for controlling the subsequent operation of the laser processing unit.

2. The laser processing system of claim 1, wherein said predetermined operation command comprises an assist gas supply command, and said predetermined external information comprises an assist gas supply monitoring signal.

3. The laser processing system of claim 1, wherein said predetermined operation command comprises a shutter open command, and said predetermined external information comprises a shutter open monitoring signal.

4. The laser processing system of claim 1, wherein said predetermined operation command comprises a gap control command, and said predetermined external information comprises a gap amount monitoring signal.

5. The laser processing system of claim 2, wherein said controller is further configured to judge whether or not said operating state is in course of laser processing, by comparing said predetermined external information with a predetermined threshold value.

6. The laser processing system of claim 1, wherein said controller is further configured to judge that said operating state is in course of laser processing, in a case where at least one operation command in a group of different operation commands required for said laser processing unit to process said workpiece is output, as said predetermined operation command, from said controller.

7. The laser processing system of claim 6, wherein said operation commands included in said group comprise two or more commands selected from an assist gas supply command, a shutter open command and a gap control command.

8. The laser processing system of claim 1, wherein said controller is further configured to judge that said operating state is in course of laser processing, in a case where at least one external information in a group of different external information required for said laser processing unit to process said workpiece is input, as said predetermined external information, to said controller.

9. The laser processing system of claim 8, wherein said external information included in said group comprises two or more signals selected from an assist gas supply monitoring signal, a shutter open monitoring signal and a gap amount monitoring signal.

10. The laser processing system of claim 2,
wherein the controller is further configured to judge that said operating state is in course of laser processing when said predetermined operation command is not output from said controller and said predetermined external information is not input to said controller, and when either:
a laser oscillation command is output from said controller, or
either of a laser output monitoring signal or a laser processing instruction is input to said controller.

11. The laser processing system of claim 1, wherein said controller is further configured to:
automatically perform said preparation process when a reason for suspending execution of said laser processing program is resolved, and automatically specify said restart condition; and
control said laser processing unit so as to wait at a position where said laser processing unit restarts under said restart condition, until a resume instruction for resuming execution of said laser processing program is provided.

12. The laser processing system of claim 1, wherein when said controller judges that said operating state is in course of laser processing, and specifies said restart condition as any one of following positions included in said predetermined conditions:
   a position immediately preceding a position at which execution of said laser processing program is suspended;
   a position of a start point of a block including a position at which execution of said laser processing program is suspended;
   a position of a start point of a block that precedes a block including a position at which execution of said laser processing program is suspended; and
   a position of a process starting point of a processing path subsequent to a processing path including a position at which execution of said laser processing program is suspended.

13. The laser processing system of claim 1, wherein said controller is further configured to:
   select said operation command or said external information, depending on a type of laser processing described in said laser processing program, and
   perform judgment of said operating state based on said operation command or external information as selected.

* * * * *